United States Patent Office 3,544,283
Patented Dec. 1, 1970

3,544,283
AMINE AND HYDRAZINE COMPLEXES OF MOLYBDENUM CHROMIUM AND TUNGSTEN CARBONYLS
Henry Drummond Murdoch, Surrey, England, and Fausto Calderazzo, Pescia, Italy, assignors to American Cyanamid Company, Stamford, Conn., a corporation of Maine
No Drawing. Filed May 2, 1967, Ser. No. 635,344
Int. Cl. C01c 1/00; C07d 107/00
U.S. Cl. 23—359
15 Claims

ABSTRACT OF THE DISCLOSURE

Amine complexes of carbonyl compounds of chromium, molybdenum and tungsten are prepared by reacting certain classes of amines with compounds having halopentacarbonyl anions of the formula:

$$[M(CO)_5X]^-$$

wherein M is chromium, molybdenum or tungsten, and X is chlorine, bromine and iodine. The process can be effected in organic solvents, water, or where the amine is a liquid, in an excess of reacting amine. Depending on the particular halogen, reaction solvent, and nature of the amine, pentacarbonyl mono-amine complexes or tetracarbonyl diamine complexes are produced. In the case of certain chelating diamines a tricarbonyl complex also results. Many of the products have been produced by other processes, but complexes with hydrazines and substituted hydrazines are new compounds and are, therefore, included as new products. The present invention includes ammonia, primary amines, ethylene diamines, and certain cyclic secondary and tertiary amines, such as piperazine and pyridine. It does not include ordinary secondary or tertiary amines.

BACKGROUND OF THE INVENTION

Amine complexes with carbonyls of the transition elements chromium, molybdenum and tungsten have been prepared from the hexacarbonyls by high temperature reactions or by processes involving activation by ultraviolet radiation and the like. It has been difficult to produce compositions in good yield and in acceptable purity. Also, the reacting conditions have left much to be desired. This has made an improved process desirable, and also, since complexes with hydrazines have not been known made by any process, the lack of availability of such complexes exists.

SUMMARY OF THE INVENTION

The present invention provides an improved process for producing amine carbonyl complexes of the transition metals chromium, molybdenum and tungsten and also includes new complexes with hydrazines, which have never been made by any process before. In accordance with the process of this invention, mono-amine or bis-amine polycarbonyl transition metal complexes of the formulae:

$$M(CO)_5am \text{ and } M(CO)_4(am)_2$$
$$\text{(mono)} \quad \text{(bis)}$$

and mixtures thereof are prepared wherein M is a transition metal selected from the group consisting of molybdenum, chromium, and tungsten, and am is a compound selected from the group consisting of:

(a) ammonia;
(b) primary organic amines;
(c) cyclic secondary and tertiary amines wherein nitrogen is part of a cyclic ring;

(d) N,N,N',N'-tetramethylethylenediamine;
(e) hydrazines which include hydrazine and substituted hydrazines such as phenylhydrazines by reacting a metallic pentacarbonyl halogen anion of the formula:

$$[M(CO)_5X]^-$$

wherein M is as defined above and X is selected from the group consisting of chlorine, bromine, and iodine, with a compound, am, as defined above, in the presence of a solvent such as water, organic solvents, or an excess of the reactant, am. The nature of the product produced will ordinarily depend upon the nature of the solvent employed and the nature of the X component as discussed in greater detail hereinbelow. It will be seen that the amine, am, is restricted either to primary amines or to amines in which nitrogen is part of a cyclic ring, and does not include ordinary secondary or tertiary amines.

The essential feature of the process is that the raw material includes a carbonyl complex of the transition metal which has a pentacarbonyl halogen anion of the formula $$[M(CO)_5X]^-$$

in which M stands for molybdenum, chromium or tungsten and X is a halogen, chlorine, bromine or iodine. The cation does not significantly enter into the process of the present invention as it is eliminated in the form of its halide. Any ordinary suitable cations may be used, simple quaternary ammonium cations, such as tetraethylammonium of tetramethylammonium being very suitable, the former being preferred. As the amine group or groups entering into the molecule behave as ligands in the general type formula for the compounds produced by the process of the present invention, they will be represented by L. It should be noted that the amine may be bidentate, such as 2,2'-dipyridyl, and may or may not be a chelating amine. An amine which has two nitrogen groups behaves as two ligands and, therefore, in type formula the number of ligands symbolized refers to reactive groups and not necessarily to molecules of a whole amine. For example, if a chelate with ethylenediamine is produced, the type formula would shown $L_2$.

With the exception of cyclic amines, such as for example pyridine and piperazine, all of the amines are primary amines. Ordinary secondary and tertiary amines do not react satisfactorily in the process of the present invention. Why the cyclic amines, such as pyridine and piperazine, react even though they are not primary amines is not fully known, and the invention is of course not restricted to any theory of why this should depart from the otherwise general rule of the present invention that the amines are primary amines, that is to say, have two hydrogens attached to each nitrogen. In this sense, of course, ammonia can be considered as a primary amine of hydrogen.

Two general forms of compounds are produced $$M(CO)_5L \text{ and } M(CO)_4L_2$$

M and L having the meanings assigned above. With chelating amines, such as ethylenediamine, it is also possible for the resulting compound to react with excess amine to form the following compound

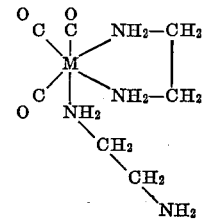

With mono-amines the reaction conditions largely determine whether a mono-amine pentacarbonyl complex is produced or a bis-amine tetracarbonyl complex. In general, when the reaction is carried out in a water medium, only the mono-amine pentacarbonyl products are produced. In the case of non-aqueous reaction media, the nature of the halogen compound has considerable effect. The iodopentacarbonyl complexes produce only the mono-amine pentacarbonyl complexes, whereas with chlorine as the halogen, predominantly the bis-amine tetracarbonyl complex is produced; bromine results in various mixtures.

The behavior of piperazine is quite interesting. In the present process only one of the amino group complexes, whereas in processes starting with hexacarbonyl complexes, such as hexacarbonylmolybdenum, only piperazinedecacarbonyldimolybdenum results. It seems obvious that the reaction mechanism of the present invention must be quite different from that proceeding in processes which start with hexacarbonyl complexes. It is, for the most part, not practical to determine in every case what, if any, transient, intermediate compounds may be formed in the reaction. It is, therefore, not desired to limit the present invention to any exact reaction mechanism theory, although, as pointed out above, it is obvious that the mechanism is quite different from that occurring in processes using the hexacarbonyls as starting materials.

In general, where the metal is molybdenum, the complexes of the present invention are yellow crystalline solids, some of which are relatively stable in the solid state. In the case of the hydrazine complexes, however, there is quite a difference between those with hydrazine and those with phenylhydrazine. Both are pale yellow solids, but the phenylhydrazine complexes are relatively unstable even in the solid state.

The new hydrazine complexes are, of course, useful in general for the same purposes as the known amine complexes whcih have been prepared by other processes.

It is an advantage of the present invention that the reaction temperatures are quite moderate, room temperature being quite suitable, although somewhat lower and somewhat higher temperatures, for example around 30° C., are quite satisfactory. There is no sharp upper limit on temperature except that at which complexes tend to decompose but there is no point in using unnecessarily high reaction temperatures as the reaction proceeds with satisfactory speed at the more moderate temperatures set out above.

DESCRIPTION OF THE PREFERRED EMBODIMENTS

The invention will be described in the following specific examples, in which the parts are by weight unless otherwise specified and the temperatures approximating room temperature unless specifically stated otherwise.

EXAMPLE 1

A mixture of 1 gm. of tetraethylammonium iodopentacarbonylmolybdenum and 5 ml. of cyclohexylamine in 75 ml. tetrahydrofuran was allowed to stand for about an hour. Tetraethylammonium iodide precipitated and was filtered off and the solvent evaporated. The resulting solid, which is yellow, was washed with water and extracted with benzene to give soluble and insoluble fractions. The benzene-soluble fraction was mono-cyclohexylamine-pentacarbonylmolybdenum and was isolated by eliminating the solvent and recrystallizing from light petroleum ether at −80° C. A high yield was obtained.

EXAMPLE 2

The procedure of Example 1 was repeated both with the iodopentacarbonylmolybdenum and with the chloropentacarbonylmolybdenum anionic derivatives, 1 gm. being stirred with 20 ml. of cyclohexylamine and 100 ml. of water. In each case the yield of the monocyclohexylaminepentacarbonylmolybdenum was substantially theoretical.

EXAMPLE 3

0.5 gm. tetraethylammonium iodopentacarbonylmolybdenum was dissolved in 5 ml. of pyridine and allowed to stand until the reaction was substantially complete. An excess of water was then added and the solid precipitate filtered, washed with water, dried, and crystallized from light petroleum ether. It was the monopyridinepentacarbonylmolybdenum and the yield was high.

EXAMPLE 4

The procedure of Example 3 was repeated except that the corresponding chloropentacarbonylmolybdenum was used. The product obtained was bis(pyridine)tetracarbonylmolybdenum.

On repeating the example with the corresponding bromopentacarbonylmolybdenum anionic derivative, a mixture of mono- and bis-pyridine complexes was obtained.

Examples 3 and 4 show the effect of the halogen in the starting material and, as pointed out earlier in general, the iodo compounds produce the mono-, the chloro compounds tend to produce the bis-, and the bromo compounds are intermediate in their action.

EXAMPLE 5

Example 4 was repeated with 1 gm. of the pentacarbonylchloromolybdenum complex, 20 ml. of pyridine and 100 ml. of water. Only the monopyridinepentacarbonylmolybdenum was produced, and the yield approached the theoretical. This shows the marked effect of the reaction medium, water tending to produce only the mono-amine complexes.

EXAMPLE 6

1 gm. of tetraethylammonium iodopentacarbonylmolybdenum and 2 gms. of ethylenediamine were stirred in tetrahydrofuran and allowed to stand for several hours; the temperature was maintained at 30° C. The reaction mixture was filtered, water was added, the solvent volume reduced under vacuum, and the solid precipitated was crystallized from a methanol/water solution. It was ethylenediaminetetracarbonylmolybdenum and the yield approximated 90%. It should be noted that the effect of a chelating diamine was to produce a tetracarbonyl complex even though the halopentacarbonylmolybdenum was the iodo compound.

EXAMPLE 7

Example 6 was repeated substituting the chloropentacarbonylmolybdenum complex for the iodo-. The reaction was faster and was carried out for only about an hour. The same product was produced, the yield being somewhat less than in the case of the iodo compound. When the solid obtained was washed thoroughly with water and precipitated from an ethylenediamine-water mixture by slow elimination of water and amine under reduced pressure, some bis(ethylenediamine) tricarbonylmolybdenum was obtained. It should be noted that the second ethylenediamine molecule reacted with only one of its two amino groups.

EXAMPLE 8

Bis(ethylenediamine)tricarbonylmolybdenum was produced in higher yields by heating 2 gms. of tetraethylammonium chloropentacarbonylmolybdenum with 10 ml. of ethylenediamine to 120° C. for a short time. Water was added, excess amine distilled off with the water under reduced pressure, and a good yield of the bis- compound was produced after precipitation, filtration, and brief washing with light petroleum ether.

The same product can be obtained by allowing the product of Example 6 to react at 30° C. with ethylenediamine in tetrahydrofuran. The product is formed very slowly and is precipitated from solution. The purification is as described above.

EXAMPLE 9

1 gm. of tetraethylammonium chloropentacarbonylmolybdenum and 10 ml. of ethylenediamine was reacted in 100 ml. of water. On filtration the resulting solid was thoroughly washed with water, light petroleum ether, and dried, and gave an almost quantitative yield of ethylenediaminepentacarbonylmolybdenum in the form of an off-white solid. If this complex is dissolved in an organic solvent, a rapid formation of the chelated ethylenediaminetetracarbonylmolybdenum occurs.

EXAMPLE 10

The general procedure of Example 6 was repeated using a corresponding amount of N,N,N',N'-tetramethylethylenediamine. Excellent yields of (N,N,N',N'-tetramethylethylenediamine)tetracarbonylmolybdenum were produced.

EXAMPLE 11

1 gm. of piperazine and 1 gm. of tetraethylammonium iodopentacarbonylmolybdenum were reacted in 75 ml. of tetrahydrofuran. Filtration and evaporation of the solvent gave piperazinepentacarbonylmolybdenum in good yield, which was crystallized from a tetrahydrofuran-water mixture.

EXAMPLE 12

Example 10 was repeated increasing the piperazine to 2 gms. and using 100 ml. of water instead of the tetrahydrofuran. This procedure was repeated both with the iodo- and the chloropentacarbonylmolybdenum complexes, and in each case a good yield of the piperazinepentacarbonylmolybdenum was obtained, the yield in the case of the iodo compound being slightly higher than in the case of the chloro compound.

EXAMPLE 13

1 gm. of tetraethylammonium chloropentacarbonylmolybdenum and 5 ml. of hydrazine hydrate were reacted in 75 ml. of water. The solid material was then filtered, washed with water and briefly with petroleum ether, and dried. Purification was effected by precipitation from a tetrahydrofuran-water mixture. A good yield of hydrazinepentacarbonylmolybdenum was obtained.

The same product was obtained in good yield from tetraethylammonium iodopentacarbonylmolybdenum.

EXAMPLE 14

Example 13 was repeated substituting 4 ml. of phenylhydrazine for the 5 ml. of the hydrazine hydrate. Excellent yield, approximating 90%, of phenylhydrazinepentacarbonylmolybdenum was obtained. The product, as in the case of Example 12, is a light yellow solid but is much less stable than the hydrazine complex of Example 14.

EXAMPLE 15

1 gm. of tetraethylammonium iodopentacarbonylmolybdenum was stirred with 30 ml. of 25% aqueous ammonia. A solid was produced which was filtered, washed with water, and dried to give ammoniapentacarbonylmolybdenum. A good yield was obtained and the same product was produced from the corresponding chloropentacarbonylmolybdenum complex, the yield being only slightly less than with the iodo complex.

EXAMPLE 16

8.3 mmoles of phenanthroline and 5 mmoles of tetraethylammonium chloropentacarbonylmolybdenum were reacted in 75 ml. of tetrahydrofuran until the starting complex was no longer identifiable by infrared. Precipitated tetraethylammonium chloride was eliminated by filtration and petroleum ether added to the filtrate. Practically quantitative yields of phenthrolinetetracarbonylmolybdenum were obtained in the form of dark red crystals.

EXAMPLE 17

The procedure of Example 16 was repeated substituting 2,2'-dipyridyl for the phenanthroline. Again the yield of the resulting tetracarbonylmolybdenum complex was substantially quantitative.

EXAMPLE 18

The procedures of Examples 16 and 17 were repeated substituting the pentacarbonylchromium complex for the molybdenum complex. Practically quantitative yields of the phenanthrolinetetracarbonylchromium and dipyridyltetracarbonylchromium complexes were obtained.

EXAMPLE 19

The procedures of Examples 16 and 17 were repeated substituting the pentacarbonyl complex of tungsten for that of molybdenum. Substantially quantitative yields of the phenanthrolinetetracarbonyltungsten and dipyridyltetracarbonyltungsten were obtained.

We claim:
1. Hydrazinepentacarbonylmolybdenum.
2. Phenylhydrazinepentacarbonylmolybdenum.
3. A process for producing a polycarbonyl metal complex selected from the group consisting of

$$M(CO)_5(am) \text{ and } M(CO)_4(am)_2$$

and mixtures thereof, wherein:
  M is a transition metal selected from the group consisting of chromium, molybdenum and tungsten;
  am is a compound selected from the group consisting of:
    (a) ammonia;
    (b) primary organic amines;
    (c) cyclic secondary and tertiary amines wherein nitrogen is part of a cyclic ring;
    (d) N,N,N',N'-tetramethylethylenediamine; and
    (e) hydrazines;
which comprises reacting a metallic pentacarbonyl halogen anion of the formula:

$$[M(CO)_5X]^-$$

wherein M is as defined above and X is selected from the group consisting of chlorine, bromine, and iodine, with a compound, am, as defined above, in the presence of a solvent selected from the group consisting of water, inert organic solvents, and excess reactant, am.

4. The process of claim 3 wherein the solvent is water and the polycarbonyl metal complex is:

$$M(CO)_5(am)$$

5. The process of claim 3 wherein the solvent is an inert organic solvent or excess reactant, am, X is iodine, and the polycarbonyl metal complex is:

$$M(CO)_5(am)$$

6. The process of claim 3 wherein the solvent is an inert organic solvent or excess reactant, am, X is chlorine, and the polycarbonyl metal complex is predominantly:

$$M(CO)_4(am)_2$$

7. The process of claim 3 wherein the solvent is an inert organic solvent or excess reactant, am, X is bromo and the polycarbonyl metal complex is a mixture of.

$$M(CO)_5(am) \text{ and } M(CO)_4(am)_2$$

8. A process according to claim 3 in which X is iodine.
9. A process according to claim 3 in which X is chlorine.

10. A process according to claim 3 in which M is molybdenum.

11. A process according to claim 8 in which M is molybdenum.

12. A process according to claim 3 in which M is chromium.

13. A process according to claim 3 in which the amine is a primary amine.

14. A process according to claim 3 in which the amine is a bidentate amine and the product is an amine tetracarbonyl metal complex.

15. A process according to claim 3 in which ammonia is one of the reactants.

References Cited

UNITED STATES PATENTS

| 3,321,485 | 5/1967 | Kozikowski et al. | 260—270 |
| 3,322,799 | 5/1967 | Coffield et al. | 260—270 |

FOREIGN PATENTS

| 782,738 | 9/1957 | Great Britain. |

OSCAR R. VERTIZ, Primary Examiner

H. S. MILLER, Assistant Examiner

U.S. Cl. X.R.

260—242, 270, 429, 438.5

UNITED STATES PATENT OFFICE
CERTIFICATE OF CORRECTION

Patent No. 3,544,283          Dated December 1, 1970

Inventor(s) HENRY DRUMMOND MURDOCH AND FAUSTO CALDERAZZO

It is certified that error appears in the above-identified patent and that said Letters Patent are hereby corrected as shown below:

Column 2, line 30, cancel "of" and substitute -- or --.

Column 3, line 37, cancel "whcih" and substitute -- which -

Column 5, line 31, cancel "Example 10" and substitute

-- Example 11 -- .

Column 5, line 57, cancel "Example 12" and substitute

-- Example 13 -- .

SIGNED AND
SEALED
MAR 9 1971

(SEAL)
Attest:

Edward M. Fletcher, Jr.
Attesting Officer

WILLIAM E. SCHUYLER, JR.
Commissioner of Patents